(12) United States Patent
Kohn

(10) Patent No.: US 7,536,487 B1
(45) Date of Patent: May 19, 2009

(54) LOW POWER MEMORY HIERARCHY FOR HIGH PERFORMANCE VIDEO PROCESSOR

(75) Inventor: Leslie D. Kohn, Fremont, CA (US)

(73) Assignee: Ambarella, Inc., Santa Clara, CA (US)

( * ) Notice: Subject to any disclaimer, the term of this patent is extended or adjusted under 35 U.S.C. 154(b) by 439 days.

(21) Appl. No.: 11/078,779

(22) Filed: Mar. 11, 2005

(51) Int. Cl.
*G06F 5/06* (2006.01)
(52) U.S. Cl. ........................ 710/52; 345/503
(58) Field of Classification Search ................. 345/503; 710/52
See application file for complete search history.

(56) References Cited

U.S. PATENT DOCUMENTS

| 6,335,950 | B1 * | 1/2002 | Kohn ................. 375/240.16 |
| 6,563,549 | B1 * | 5/2003 | Sethuraman ............. 348/700 |
| 2003/0021344 | A1 * | 1/2003 | Panusopone et al. ... 375/240.16 |
| 2003/0222877 | A1 * | 12/2003 | Tanaka et al. ............. 345/503 |
| 2004/0104913 | A1 * | 6/2004 | Walls et al. ............. 345/506 |
| 2004/0179619 | A1 * | 9/2004 | Tian et al. ............. 375/240.26 |
| 2005/0111548 | A1 * | 5/2005 | Lee et al. ............. 375/240.12 |
| 2005/0129121 | A1 * | 6/2005 | Sung ................. 375/240.16 |
| 2006/0050976 | A1 * | 3/2006 | Molloy .................. 382/233 |
| 2006/0176954 | A1 * | 8/2006 | Lu et al. ............. 375/240.03 |

\* cited by examiner

*Primary Examiner*—Henry W. H. Tsai
*Assistant Examiner*—Kris Rhu
(74) *Attorney, Agent, or Firm*—Christopher P. Maiorana, PC

(57) ABSTRACT

An apparatus generally having an internal memory and an external transfer circuit is disclosed. The internal memory may be disposed on a chip and may contain at least one first buffer for storing a subset of at least one reference frame (i) suitable for motion compensation and (ii) stored in an external memory off the chip. A size of the at least one first buffer generally exceeds one row of blocks in the reference frame. The external transfer circuit may be disposed on the chip and configured to transfer the subset from the external memory to the internal memory.

25 Claims, 4 Drawing Sheets

LOW POWER MEMORY HIERARCHY FOR HIGH PERFORMANCE VIDEO PROCESSOR

FIELD OF THE INVENTION

The present invention relates to memories generally and, more particularly, to a method and/or architecture for implementing a low power memory hierarchy for a high performance video processor.

BACKGROUND OF THE INVENTION

Conventional high bandwidth memory systems are used for demanding image processing applications such as real time video encoding. A worst case memory latency and bandwidth must meet the criteria of a video encoding system since dropped frames cannot be tolerated. Recent high definition video encoding and high efficiency encoding systems, such as the H.264 standard, are dramatically increasing the worst case bandwidth specifications. In conventional real time systems, external dynamic random access memory (DRAM) chips provide a full worst case bandwidth for the real time video encoding. Conventional on-chip caches, that provide sufficient bandwidth and latency when hitting the cache, do not provide sufficient worst case performance when missing the cache. As a result, power consumption of advanced real time video processing circuits are excessive for portable applications.

SUMMARY OF THE INVENTION

The present invention concerns an apparatus generally comprising an internal memory and an external transfer circuit. The internal memory may be disposed on a chip and may contain at least one first buffer for storing a subset of at least one reference frame (i) suitable for motion compensation and (ii) stored in an external memory off the chip. A size of the at least one first buffer generally exceeds one row of blocks in the reference frame. The external transfer circuit may be disposed on the chip and configured to transfer the subset from the external memory to the internal memory.

The objects, features and advantages of the present invention include providing a memory hierarchy for a high performance video processor that may (i) consume low power, (ii) minimize bandwidth use to an external memory, (iii) hide a latency accessing the external memory and/or (iv) maximize efficient long burst exchanges with the external memory.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
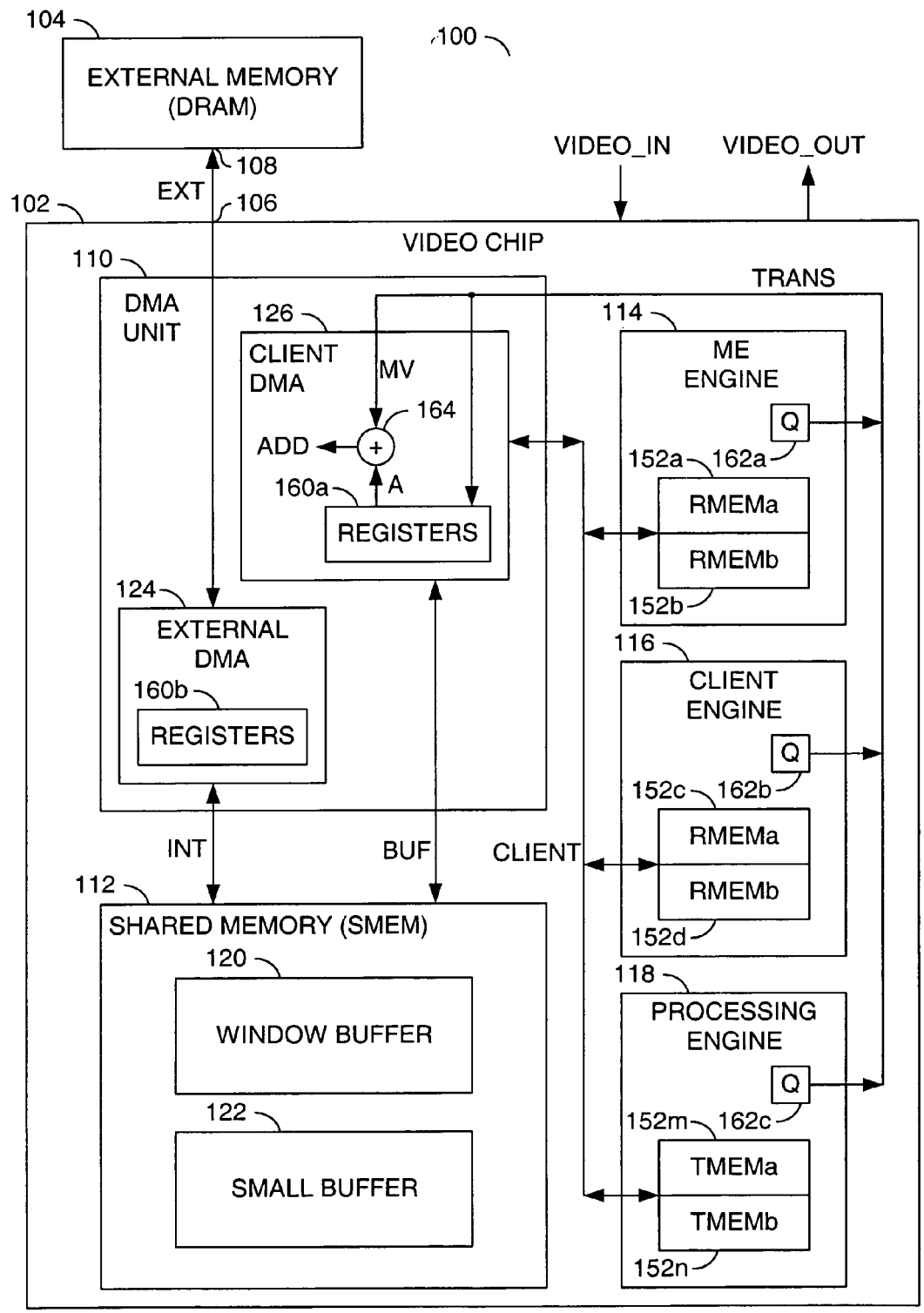
FIG. 1 is a block diagram of a system in accordance with a preferred embodiment of the present invention.

Referring to FIG. 1, a block diagram of a system 100 is shown in accordance with a preferred embodiment of the present invention. The system (or apparatus) 100 generally comprises a circuit (or chip) 102 and a circuit (or chip) 104. An interface 106 of the circuit 102 may be coupled to an interface 108 of the circuit 104. A signal (e.g., EXT) may be transferred between the circuit 102 and the circuit 104 through the interfaces 106 and 108. The circuit 102 may receive an input signal (e.g., VIDEO_IN). An output signal (e.g., VIDEO_OUT) may be presented from the circuit 102.

The circuit 102 may be referred to as a video chip. The video chip 102 may be operational to process video information stored in the circuit 104. Processing may include, but is not limited to, encoding, decoding, motion estimation and motion compensation. The video chip 102 is generally fabricated as a single integrated circuit die or chip. Portions of the video information may be carried by the signal EXT from the circuit 104 to the video chip 102 for processing. Video information may also be carried by the signal EXT from the video chip 102 back to the circuit 104.

The circuit 104 may be referred to as an external memory chip. The external memory chip 104 is generally fabricated as a single integrated circuit die or chip separate from the video chip 102. The external memory chip 104 may be operational to store multiple video frames, including one or more reference frames, one or more frames to be processed and one or more processed frames.

For an encoder implementation, an output bitstream (e.g., the signal VIDEO_OUT) presented by the video chip 102 may compatible with a video standard ITU-T Revised Recommendation H.264(E):2005 "Advanced Video Coding for Generic Audiovisual Services" (ITU-T Revised Rec. H.264(E)|ISO/IEC 14496-10(E)), published by the Joint Video Team (JVT) of the International Organization for Standardization/International Electrotechnical Commission (ISO/IEC) MPEG and the Video Coding Expert Group (VCEG) of the International Telecommunications Union-Telecommunications Standardization Sector (ITU-T), Feb. 28, 2005, Geneva, Switzerland. In a decoding implementation, an input bitstream (e.g., the signal VIDEO_IN) received by the video chip 102 may be compatible with the H.264(E)|ISO/IEC 14496-10(E) standard. Other methods of coding may be implemented to meet the criteria of a particular application.

The video chip 102 generally comprises a circuit (or module) 110, a circuit (or module) 112, an optional circuit (or module) 114, an optional circuit (or module) 116 and an optional circuit (or module) 118. The circuit 110 may communicate with the external memory chip 104 through the signal EXT. A signal (e.g., INT) may be used to exchange video information between the circuit 110 and the circuit 112. Another signal (e.g., BUF) may also be used to exchange video information between the circuit 110 and the circuit 112. The circuit 110 may exchange video information in a signal (e.g., CLIENT) with the circuits 114-118. A signal (e.g., TRANS) may be provided by the circuit 114-118 back to the circuit 110.

The circuit 110 may be referred to as a direct memory access (DMA) unit. The DMA unit 110 may be operational to transfer data (e.g., portions of video frames, motion vectors and/or other video information) between the circuit 112 and both the external memory chip 104 and the circuits 114-118. Control of the transfers may be governed by information received in the signal TRANS from the circuits 114-118. The DMA unit 110 may also be referred to as a transfer circuit (or module).

The circuit 112 may be referred to as a shared memory (SMEM) circuit. The SMEM circuit 112 may be implemented as a memory circuit operational to store or buffer the video information flowing between the external memory chip 104 and the circuits 114-118. The SMEM circuit 112 may also be operational to buffer video information transferred among the circuits 114-118. The SMEM circuit 112 is generally fabricated on (or in) the same chip as the DMA unit 110 and the circuits 114-118.

The circuit 114 may be referred to as a motion estimation (ME) engine. The ME engine may be operational to perform motion estimations using portions of a reference frame received from the external memory chip 104 through the SMEM circuit 112 and the DMA unit 110. The ME engine 114 may be implemented where the video chip 102 is part of a video encoder system and absent where the video chip 102 is part of a video decoder-only system. The ME engine 114 is generally fabricated on (or in) the same chip as the DMA unit 110, the SMEM circuit 112 and the circuits 116-118.

The circuit 116 may be referred to as a client engine. The client engine 116 may be operational to access the SMEM circuit 112 for processing video information. Input data in the signal VIDEO_IN may be routed to the client engine 116 for client-specified processing. Output data may be generated by the client engine 116 for presentation in the signal VIDEO_OUT. Other SMEM clients (e.g., the motion estimation engine 114 and the circuit 118) may receive the input data from the signal VIDEO_IN and/or generate the output data presented in the signal VIDEO_OUT. The client engine 116 is generally fabricated on (or in) the same chip as the DMA unit 110, the SMEM circuit 112, the ME engine 114 and the circuit 118.

The circuit 118 may be referred to as a processing engine. The processing engine 118 may be operational to modify video information buffered in the SMEM circuit 112. Video encoding and decoding operations performed by the processing engine 118 may include, but are not limited to, forward and inverse transforms, forward and inverse quantization, variable length encoding and decoding. The processing engine 118 is generally fabricated on (or in) the same chip as the DMA unit 110, the SMEM circuit 112, the client engine 114 and the ME engine 116.

Additional processing engines (not shown) may be included in the video chip 102 to perform additional image processing operations. The additional image processing operations may include, but are not limited to, color decimation and interpolation, contrast adjustments, brightness adjustments, fading effects, overlays, noise filtering, and the like.

Motion compensation may be performed by the video chip 102 without a dedicated motion compensation engine. Integer motion compensation may be performed using the DMA unit 110. Fractional motion compensation may be performed by the SMEM clients (e.g., the client engine 116 and/or the processing engine 118) as appropriate.

The on chip SMEM circuit 112 is generally used to hold or buffer each of one or more image frames used by the processing engines 114-118. Two different buffer types may be provided in the SMEM circuit 112. A first buffer type 120 may be referred to as a window buffer. One or more window buffers 120 may exist in the SMEM circuit 112 simultaneously. Each window buffer 120 may hold a full width of an image (or frame) and a subset of a full height of the image (or frame). For example, the width of a window buffer 120 may match a width of a frame while a height of the window buffer 120 may store two or more macroblock rows of the frame.

A second buffer type 122 may be referred to as a small buffer. Zero or more small buffers 122 may exist in the SMEM circuit 112 simultaneously. A size of each small buffer 122 is generally a subset of the width and the height of the image (or frame). For example, a small buffer 122 may be sized to hold a portion of a single row of macroblocks copied from a frame stored in the external memory chip 104 or copied from the window buffer 120.

The window buffers 120 and the small buffers 122 may be augmented with DMA modules 124 and 126 in the DMA unit 110. One or more of the external DMA modules 124 (one shown) and one or more of the client DMA modules 126 (one shown) generally allow transfers between the external memory chip 104 and the buffers 120 and/or 122 to be overlapped with transfers between the buffers 120 and/or 122 and the internal processing engines 114-118. The DMA modules 124 may also be referred to as external DMA circuits (or channels) and an external transfer circuits (or channels). The DMA modules 126 may also be referred to as client DMA circuits (or channels) and a client transfer circuits (or channels). The transfer circuits 124 and 126 may be implemented in hardware and/or software. Designs of the external transfer circuits 124 and/or the client transfer circuits 126, other than as DMA circuits, may be implemented to meet the criteria of a particular application.

Figure 2:
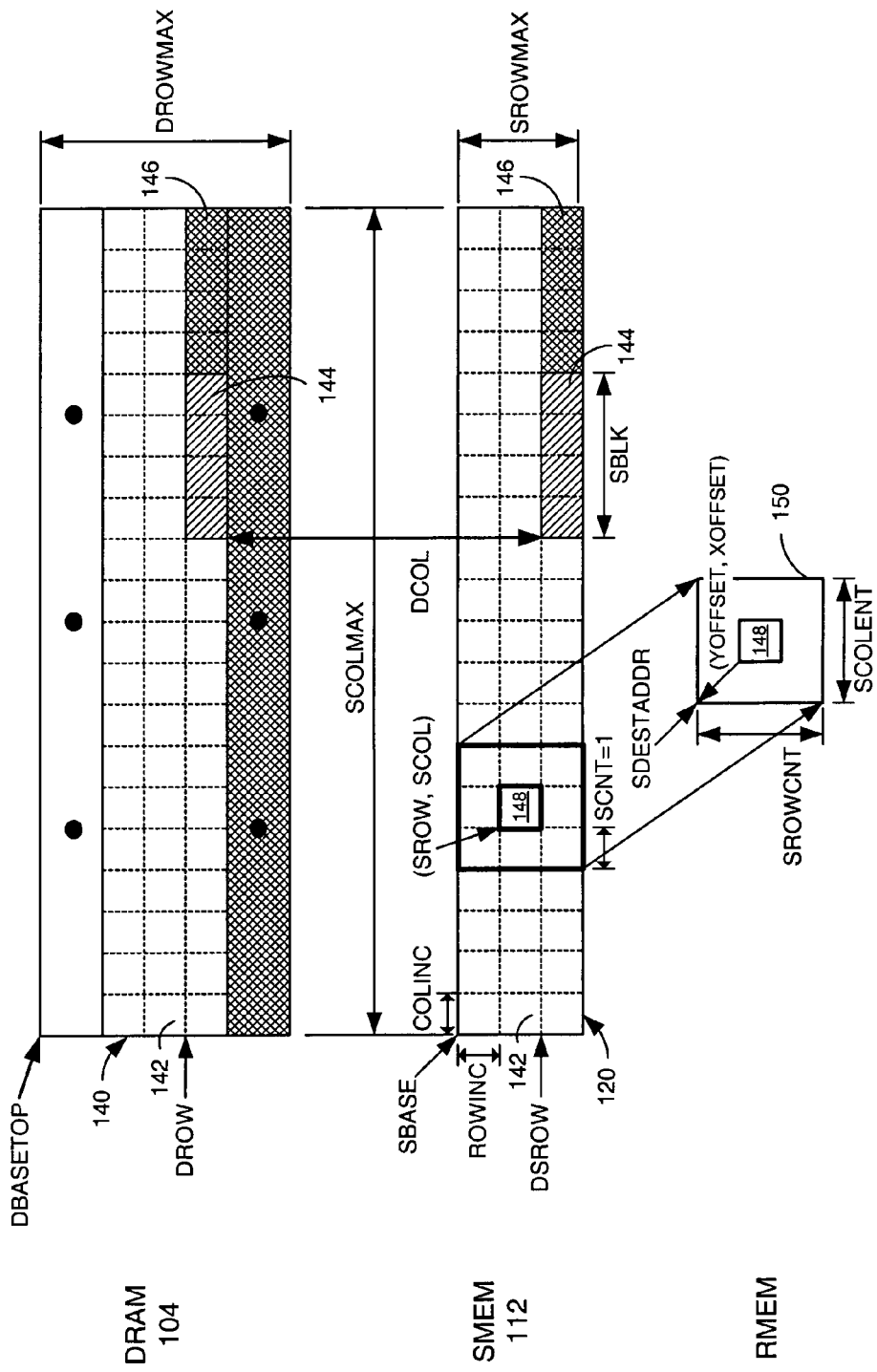
FIG. 2 is a block diagram of a portion of an image in a window mode.

Referring to FIG. 2, a block diagram of a portion of an image 140 in a window mode is shown. The image (or frame) 140 may be an incoming video frame or a reference frame. The image 140 may be located in the external memory chip 104 starting at a location (e.g., DBASETOP). The image 140 may have a width (e.g., SCOLMAX) and a height (e.g., DROWMAX). FIG. 2 generally shows a first portion 142 of the image 140 already transferred to the SMEM circuit 112. A DMA transfer in-progress for a second portion 144 of the image 140 (e.g., one macroblock row by SBLK macroblock columns) from the external memory chip 104 to the SMEM circuit 112 is also illustrated. The second portion 144 may start in a particular row (e.g., DROW) and a particular column (e.g., DCOL) of the image 140. A third portion 146 of the image 140 may be schedule for transfer to the SMEM circuit 112 after the second portion 144 has been transferred.

The destination window buffer 120 may be defined in the SMEM circuit 112 starting at a base location (e.g., SBASE). The destination window buffer 120 may accommodate the macroblock width SCOLMAX of the image 140 and several rows (e.g., SROWMAX) of blocks from the image 140 simultaneously. Since the width of the image 140 generally matches the width of the window buffer 120, a starting column (e.g., DCOL) for the second portion 144 may be the same in the window buffer 120 as in the external memory chip 104.

The window buffers 120 may be operational to support random accesses to a region of the image 140 within a vertically limited offset of a target block (macroblock) 148. The target block 148 may have a location (e.g., (SROW, SCOL)) in the window buffer 120 relative to the base location SBASE.

The window buffers 120 may be particularly useful for motion compensated video compression processes. Typically, a vertical motion vector range of the window buffer 120 may be limited to the vertical search range of a motion estimation process. In particular, when a motion vector becomes too large, the associated motion compensated predictor generally becomes inaccurate and the motion estimation computation may become too expensive. Therefore, the amount of the image 140 useful for motion compensation will be limited both vertically and horizontally around the target block 148. Since the human visual system generally tracks fast horizontal motion easier than fast vertical motion, video sequences generally have a smaller vertical motion vector range than a horizontal motion vector range. As a result, the vertical search range may be made smaller than the horizontal search range and only a limited number of macroblock rows need to be buffered by the window buffers 120.

In one embodiment, the on-chip SMEM memory circuit 120 may be implemented using a high density on-chip memory technology such as embedded DRAM or 1-transistor static random access memory (SRAM) (rather than 6-transistor SRAM) to allow adequate vertical motion vector range for fast-moving video sequences. A vertical range of the window buffer 120 is generally set to the vertical motion vector range. Matching the vertical window buffer 120 range to the vertical motion vector range generally allows all motion estimation and motion compensation fetches to be performed using only the SMEM circuit 112 rather than in the external memory chip 104. Accessing the on-chip SMEM circuit 112 may be much more power efficient than repeatedly accessing the external memory chip 104, since the on-chip SMEM circuit 112 is much smaller and closer to the processing engines 114-118. In addition, the on-chip SMEM circuit 112 is generally more efficient in accessing small transfers than standard DRAM components used for the external memory chip 104, which may be optimized for long burst transfers.

Since an entire reference frame is generally not stored in the SMEM circuit 112, an external DMA module 124 may be used to read new reference data into the window buffer 120 and discard the oldest data in the window buffer 120 as the target block 148 is advanced (typically from macroblock to macroblock). The external DMA module 124 may keep the window buffer 120 centered on the target block 148 location so that a constant vertical motion compensation range is maintained. The external DMA module 124 may load each pixel of the reference frame from the external memory chip 104 only once per frame, regardless of a number of motion searches and/or a number of motion compensations performed. The once-only load may considerably reduce a bandwidth between the external memory chip 104 and the video chip 102 compared with (i) accessing all data from the external memory chip 104 or (ii) a worst case behavior of a conventional cache system (that is even worse than directly accessing the external memory chip 104 due to higher latency and cache block size overhead). Even a conventional on-chip cache that stores a horizontally limited region of the image centered on the target block 148 will end up reading the image data from the external memory chip 104 multiple times as the target block 148 moves from one row of macroblocks to the next, multiplying the external memory chip 104 bandwidth utilization as the size of the search region increases.

Once a portion of the image 140 has been copied into the window buffer 120, a client DMA module 126 may move a subportion (or subwindow) 150 of the image 140 from the window buffer 120 to one or more of the processing engines 114-118. For example, the client DMA module 126 may transfer the subportion 150 to one or more local memories 152*a*-152*n* in the processing engines 114-118. The local memories 152*a*-152*n* may be referred to as an RMEM (reference memory), a TMEM (target memory) and a local memory 152 for short. A TMEM may be sized to store one or more target blocks 148. An RMEM may be sized to store the search range around the target block 148 position of one or more reference frames.

The subportion 150 may have a width (e.g., SCOLCNT) and a height (e.g., SROWCNT) larger than the target block 148. The reference block corresponding to zero motion is generally centered in the subportion 150 at an offset (e.g., (YOFFSET, XOFFSET) from a base location (e.g., SDE-SADDR) of a destination local memory 152. As a processing engine 114-118 completes operation on a target block, the horizontal offset of the target (e.g., SCOL) is generally incremented by a programmable number (e.g., COLINC) which is typically the width of the block. After a processing engine 114-118 completes operations on a programmable number (e.g., SCNT) of the target blocks 148, the external DMA module 124 may copy a new subportion into the window buffer 120. Once the target block 148 reaches an end (e.g., right side) of the image 140 in the window buffer 120, the client DMA module 126 may reset the horizontal offset of the target (e.g., SCOL) to zero and increment the vertical offset by a programmable number (e.g., ROWINC), which is typically the target height.

Figure 3:
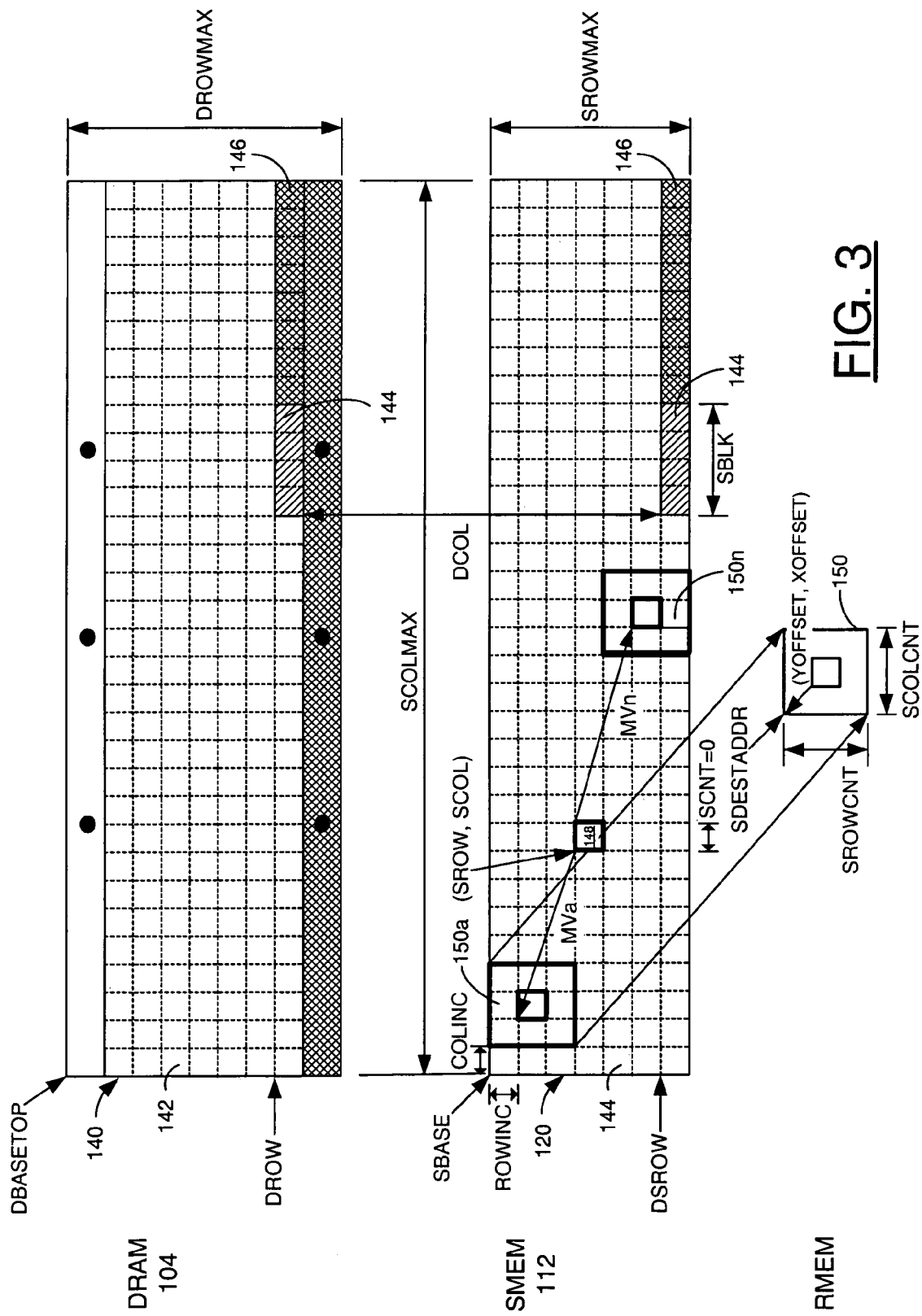
FIG. 3 is a block diagram of the image in the window mode with a motion vector.

Referring to FIG. 3, a block diagram of the image 140 in the window mode with a motion vector is shown. In motion compensation processing, each target block 148 may have one or more associated motion vectors relative to one or more reference frames respectively. The motion vectors may have a maximum vertical range that may define a maximum height of the window buffers 120.

As shown in FIG. 3, a first maximum motion vector (e.g., MVa) may point up and to the left in the reference frame. Therefore, the client DMA module 126 may copy a subportion 150*a* from the window buffer 120 to the local memory 152 offset from the target block 148 location by the motion vector MVa. A last maximum motion vector (e.g., MVn) may point down and to the right in the reference frame. Therefore, the client DMA module 126 may copy a subportion 150*n* from the window buffer 120 to the local memory 152. Other motion vectors of different magnitudes and directions may be used by the client DMA module 126 to copy different subsets of image data from the window buffer 120 to the local memory 152.

Figure 4:
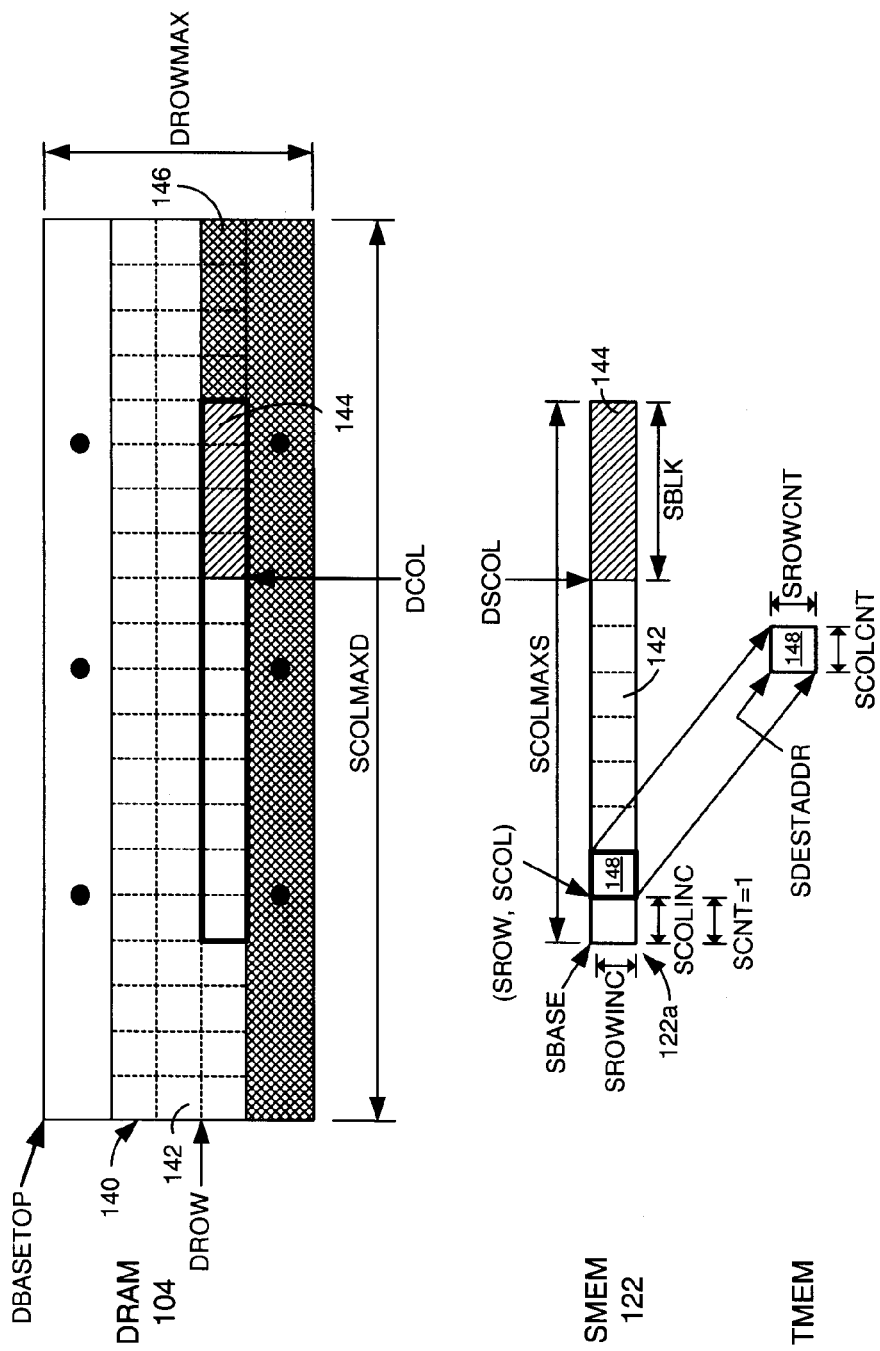
FIG. 4 is a block diagram of a portion of the image in a small buffer mode.

Referring to FIG. 4, a block diagram of a portion of the image 140 in a small buffer mode is shown. Each small buffer 122 may be configured to store less than a full row of blocks from the image 140. In particular, the small buffer 122 may have a height (e.g., SROWINC) of a single block. A width (e.g., SCOLMAXS) of the small buffer 122 may be smaller than the width SCOLMAX of the image 140. The client DMA module 126 may exchange only the target block 148 with the local memory 152 for processing.

The small buffers 122 are generally used for buffering image data being transferred between a first processing engine 114-118 and either the external DRAM memory chip 104 or a second of the processing engines 114-118. The small buffers 122 may be useful for frames that may be processed block sequentially where buffering an entire width of the frame generally wastes on-chip memory. The small buffers 122 may be used to decouple a long latency exchange with the external memory chip 104 from shorter latency criteria of the internal processing engines 114-118. Implementing both the small buffers 122 and the window buffers 120 in a shared on-chip SMEM memory circuit 112 generally provides more flexibility in allocating memory space and bandwidth between the two types of buffers. A single high density on chip SMEM circuit 112 array may also be more efficient to implement than two separate arrays.

The DMA modules 124 and 126 are generally controlled by two sets of registers (or memories) 160*a*-160*b*. The registers 160*a* may also be referred to as client DMA registers (or memories) and client offset registers (or memories). The registers 160*b* may also be referred to as external DMA registers (or memories) and external offset registers (or memories).

The DMA modules 124 and 126 may support two dimensional block data transfers optimized for image processing. The client DMA registers 160*a* may control transfers between the processing clients (the processing engines 114-118) and the SMEM circuit 112. The external DMA registers 160b may control transfers between the external memory chip 104 and the SMEM circuit 112. The SMEM circuit 112 and the DMA modules 124 and 126 are generally coupled together to implement (i) prefetching of DRAM data for client reads and (ii) storing DRAM data back to the external memory chip 104 behind client writes so that the latency to access the external memory chip 104 is hidden.

The client processing engines 114-118 and a separate engine control processor (not shown) generally issue DMA requests in signals (e.g., TRANS) that may specify a particular set of DMA registers (channels) in the register sets 160a-160b. The client DMA registers 160a may specify (i) the base location SBASE, the height SROWMAX and the width SCOLMAX or SCOLMAXS of a window buffer 120 or a small buffer 122, (ii) the ratio of the external transfer width SBLK to the width of a data block 144 being transferred, and (iii) the horizontal offset SCOL and vertical offset SROW of the data block 144 within the window buffer 120. In the window mode (e.g., FIGS. 2 and 3), the width of the window buffer 120 and a width of the frame as stored in the external memory chip 104 may match. In the small buffer mode (e.g., FIG. 4), the width SCOLMAXS of the small buffer 122 and the width SCOLMAXD of the frame in the external memory chip 104 may be specified separately. Transfer requests involving the window buffer 120 may include a motion vector signal (e.g., MV) specifying an additional horizontal and vertical offset. The motion vector offset values generally allow motion compensation to be handled as part of the DMA transfer. A signal (e.g., A) carrying a starting location for a subportion of the window buffer 120 may be added to the motion vector values by an adder 164 within the client DMA modules 126 to generate an address signal (e.g., ADD). The signal ADD may instruct the associated client DMA module 126 where to find the proper block within the window buffer 120 for transfer to a client engine 114-118.

Each client processing engine 114-118 and separate engine control processor maintains a list of outstanding DMA requests to the DMA unit 110 in a queue 162a-162c, respectively. The DMA unit 110 may process requests from each queue 162a-162c and either return data for reads or retrieve data for stores. The client DMA modules 126 may also queue another kind of request from the clients in the window buffer mode that generally causes the associated client DMA module 126 to advance to the next target block 148 in the window buffer 120. Generally, the advance may result in an incrementing of the current horizontal offset SCOL by a software-specified amount (e.g., SCOLCNT). However, if the increment results in the horizontal offset reaching the width of the window buffer 120, the horizontal offset SCOL of the target block 148 may be set to zero and the current vertical offset SROW may be incremented by a software-specified amount (e.g., SROWINC). The increment request may also specify which external DMA module 124, if any, is coupled to the client DMA module 126. Having a separate increment request generally allows multiple motion compensation DMA requests to be made for a current target block 148 before moving to a next target block.

The client DMA modules 126 generally perform an implicit increment request after each normal DMA module in the small buffer mode and may specify both the horizontal increment size and the coupled external DMA module 124 in the register set 160a. Since small buffer mode DMAs are generally not used for motion compensated accesses, a separate increment operation is generally not implemented. If an external DMA module 124 is coupled to a client DMA module 126, then a transfer from the external memory circuit 104 may be initiated through the coupled external DMA module 124 after a certain number of increments in the client DMA module 126. The number of increments per DRAM request may be specified in the client DMA registers 160a.

Each processing engine 114-118 may implement a double banked local memory RMEM and/or TMEM to allow DMA transfers to be performed in one bank (e.g., 152a) while the engine 114-118 processes the data in the other bank (e.g., 152b). The double banked local memory generally allows a latency to access the SMEM circuit 112 to be hidden from the processing engines 114-118. Synchronization between client processing engines 114-118 and the DMA processing is generally handled as follows. A "last" bit may be included in the DMA request in the signal TRANS that identifies the request as a last request to the current DMA bank. When the DMA unit 110 completes the "last" request, the DMA unit 110 may wait until the client (e.g., 114) indicates completion of processing from a current memory bank (e.g., 152b). Similarly the client 114 generally waits for the DMA unit 110 to complete DMA transfers to a corresponding memory bank (e.g., 152a) after the client 114 completes processing the bank 152b. When both the client 114 and the DMA unit 110 are ready, the banks 152a and 152b may be swapped. Processing by the client 114 may resume from the local memory bank 152a and DMA transfers may resume with the local memory bank 152b.

The external DMA registers 160b generally specify (i) the base location DBASETOP and height DROWMAX of the frame 140 in the external memory 104, (ii) the horizontal offset DCOL and the vertical offset DROW within the frame 140 of the data blocks 144 to be transferred, and (iii) either the current SMEM row offset SROW (window mode) or SMEM column offset SCOL (small buffer mode). For the window mode, the current SMEM column offset SCOL generally matches the external frame offset. For the small buffer mode, the SMEM row offset SROW may always be zero. The height of the external memory chip 104 transfer may be the same as the associated SMEM client DMA register 160a transfer height. The width of the external memory transfers may match the SMEM horizontal increment size SCOLCNT multiplied by the number of SMEM increments/external memory transfers specified in the associated SMEM client DMA register 160a (SCNT). As such, a constant distance between a prefetch read/write behind point and the current target block 148 may be maintained.

In one embodiment, two external memory requests may be queued up for each external DMA module 124. A first external memory request may be overlapped with a client transfer request involving data being transferred in the same SMEM buffer. If the client is fast enough, a second external memory request may be triggered prior to completing the first request. Therefore, subsequent client DMA transfers may be blocked until the first external memory request is completed. The blocking generally provides synchronization between external memory transfers and SMEM transfers by preventing the clients 114-118 from getting ahead of an external memory prefetch point or an external memory writebehind point.

In one possible application, the present invention may be applied to portable video recording devices. For example, the present invention may be incorporated into a hand-held, high-definition or standard-definition, digital video camera suitable for the consumer market. The memory hierarchy of the present invention generally provides the camera with a high-performance, low-power, video processing capability. Video encoding/compression may be compliant with the H.264/MPEG4-Advanced Video Coding standard or other advanced video encoding techniques. In-camera storage could provide more than an hour of high-definition recording. The present invention may also be suitable for any processor implementing motion compensated video compression and/or decompression. Other applications of the present invention may be implemented to meet the criteria of a particular design.

The present invention may also be implemented by the preparation of ASICs, FPGAs, by interconnecting an appropriate network of conventional component circuits (such as conventional circuit implementing a state machine), or by a combination of hardware and software elements as is described herein, modifications of which will be readily apparent to those skilled in the art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
an internal memory disposed on a chip and containing at least one first buffer for storing a subset of at least one reference frame (i) suitable for motion compensation and (ii) stored in an external memory off said chip, wherein a size of said at least one first buffer exceeds one row of blocks in said reference frame; and
an external transfer circuit disposed on said chip and configured to (i) transfer said subset from said external memory to said internal memory and (ii) transfer a new set of said blocks from said external memory to said first buffer as processing of an old set of said blocks in said first buffer completes, wherein (1) a size of said new set (a) matches said old set and (b) occupies a portion of said first buffer and (2) each of said blocks in said reference frame are transferred from said external memory to said first buffer only once per target frame to facilitate a plurality of motion estimations between said target frame and said reference frame.

2. The apparatus according to claim 1, further comprising a client transfer circuit disposed on said chip, separate from said internal memory and configured to transfer image data from said internal memory to a processing engine.

3. The apparatus according to claim 2, wherein said client transfer circuit uses a plurality of client offset memories specifying a plurality of internal offsets within said at least one first buffer used for transferring said blocks between said internal memory and said processing engine.

4. The apparatus according to claim 3, wherein said client transfer circuit is further configured to increment at least one of said internal offsets by a programmable amount in response to an increment request from a client.

5. The apparatus according to claim 3, wherein at least one vector offset in a transfer request to said client transfer circuit is added to at least one of said internal offsets stored in said client offset memories.

6. The apparatus according to claim 2, wherein said processing engine comprises a double buffered local memory, a first portion of said double buffered local memory being configurable for a transfer of data between said processing engine and said internal memory and a second portion of said double buffered local memory being configurable for an operation on said data by said processing engine.

7. The apparatus according to claim 6, wherein said first portion and said second portion are swapped when both said transfer and said operation are completed.

8. The apparatus according to claim 3, wherein said external transfer circuit uses a plurality of external offset memories specifying a plurality of external offsets within said reference frame used for transferring data between said internal memory and said external memory.

9. The apparatus according to claim 8, wherein (i) at least one of said external offset memories is linked to at least one of said client offset memories and (ii) a transfer between said external memory and said internal memory is triggered by an action on said at least one client offset memory to transfer between said internal memory and said processing engine.

10. The apparatus according to claim 9, wherein said client transfer circuit is further configured to block a client transfer between said internal memory and said processing engine while at least a particular number of memory transactions between said external memory and said internal memory are pending.

11. The apparatus according to claim 1, wherein (i) said one row of blocks comprises at least five blocks adjacent to each other horizontally and (ii) said size comprises at least two of said blocks vertically.

12. The apparatus according to claim 11, wherein said internal memory contains at least one second buffer smaller than said one row of blocks wide and at least two of said blocks wide.

13. The apparatus according to claim 1, wherein said reference frame comprises a width of at least 128 pixels.

14. An apparatus comprising:
an internal memory disposed on a chip and containing a first buffer for storing a subset of at least one reference frame (i) suitable for motion compensation and (ii) stored in an external memory off said chip, wherein (a) a width of said first buffer matches that of said reference frame and a height of said first buffer spans a plurality of blocks of said reference frame, (b) a new set of said blocks is received from said external memory as processing of an old set of said blocks in said first buffer completes and (c) a size of said new set (1) matches said old set and (2) occupies a portion of said first buffer; and
a first processing engine disposed on said chip and configured to operate on at least a first portion of said subset from said internal memory, wherein each of said blocks in said reference frame are transferred from said external memory to said first buffer only once per target frame to facilitate a plurality of motion estimations between said target frame and said reference frame.

15. The apparatus according to claim 14, further comprising a transfer circuit disposed on said chip, separate from said first processing engine and configured to transfer (i) a second portion of said subset from said external memory to said internal memory and (ii) said first portion of said subset from said internal memory to said first processing engine.

16. The apparatus according to claim 15, wherein (i) said first processing engine is configured to supply both a horizontal offset and a vertical offset to said transfer circuit and (ii) said transfer circuit performs a motion compensation by reading said first portion from said first buffer at said horizontal offset and said vertical offset.

17. The apparatus according to claim 14, wherein said first processing engine comprises a motion estimation engine.

18. The apparatus according to claim 14, wherein said internal memory contains a second buffer having a width less than one row of said blocks of said reference frame and at least two of said blocks wide, said one row of blocks comprising at least five blocks adjacent to each other horizontally.

19. The apparatus according to claim 18, further comprising an external transfer circuit configured to transfer data between said second buffer and said external memory.

20. The apparatus according to claim 14, further comprising a second processing engine disposed on said chip and configured to receive image data from said internal memory.

21. The apparatus according to claim 20, further comprising a transfer circuit separate from said internal memory and configured to transfer data between said first processing engine and said second processing engine using a second portion of said internal memory as intermediate storage.

22. The apparatus according to claim 14, wherein each of said blocks in said reference frame are transferred from external memory to said first buffer only once per said target frame to facilitate a plurality of motion compensations of said reference frame.

23. The apparatus according to claim 14, further comprising a client engine disposed on said chip, separate from said internal memory, in communication with said internal memory and configured to at least one of (i) process an input bitstream and (ii) generate an output bitstream.

24. An apparatus comprising:
- an internal memory disposed on a chip and containing a first buffer for storing a subset of at least one reference frame (i) suitable for motion compensation and (ii) stored in an external memory off said chip, wherein a width of said first buffer matches that of said reference frame and a height of said first buffer spans a plurality of blocks of said reference frame; and
- a motion estimation engine disposed on said chips separate from said internal memory and configured to operate on at least a first portion of said subset from said internal memory, wherein each of said blocks in said reference frame are transferred from said external memory to said first buffer only once per target frame to facilitate a plurality of motion estimations between said target frame and said reference frame.

25. An apparatus comprising:
- an internal memory disposed on a chip and containing at least one first buffer for storing a subset of at least one reference frame (i) suitable for motion compensation and (ii) stored in an external memory off said chip, wherein a size of said at least one first buffer exceeds one row of blocks in said reference frame;
- an external transfer circuit disposed on said chip, separate from said internal memory and configured to transfer said subset from said external memory to said internal memory; and
- a motion compensation engine disposed on said chip, separate from said internal memory, separate from said external transfer circuit and configured to operate on at least a first portion of said subset from said internal memory, wherein each of said blocks in said reference frame are transferred from said external memory to said first buffer only once per target frame to facilitate a plurality of motion compensations of said reference frame.

* * * * *